(12) United States Patent
Etori (10) Patent No.: US 10,295,018 B2
(45) Date of Patent: May 21, 2019

(54) ENGAGEMENT CHAIN AND MOVABLE BODY MOVEMENT DEVICE

(71) Applicant: TSUBAKIMOTO CHAIN CO., Osaka-shi, Osaka (JP)

(72) Inventor: Takeshi Etori, Daito (JP)

(73) Assignee: TSUBAKIMOTO CHAIN CO., Osaka-shi (JP)

(*) Notice: Subject to any disclaimer, the term of this patent is extended or adjusted under 35 U.S.C. 154(b) by 0 days.

(21) Appl. No.: 15/743,007

(22) PCT Filed: Feb. 14, 2017

(86) PCT No.: PCT/JP2017/005380
§ 371 (c)(1),
(2) Date: Jan. 9, 2018

(87) PCT Pub. No.: WO2017/145875
PCT Pub. Date: Aug. 31, 2017

(65) Prior Publication Data
US 2018/0216703 A1    Aug. 2, 2018

(30) Foreign Application Priority Data

Feb. 22, 2016   (JP) ................................. 2016-031145

(51) Int. Cl.
*B66F 7/12*        (2006.01)
*F16G 13/07*     (2006.01)
(Continued)

(52) U.S. Cl.
CPC ................ *F16G 13/07* (2013.01); *B66F 3/06* (2013.01); *B66F 7/12* (2013.01); *B66F 7/28* (2013.01);
(Continued)

(58) Field of Classification Search
CPC .......... F16G 13/06; F16G 13/20; F16G 13/07; F16H 27/02; F16H 29/20; F16H 29/02;
(Continued)

(56) References Cited

U.S. PATENT DOCUMENTS 3,645,146 A * 2/1972 Nagin ..................... F16G 13/06
  254/133 R
8,341,931 B2 * 1/2013 Ando ..................... B66F 7/0666
  187/250

(Continued)

FOREIGN PATENT DOCUMENTS

EP    0 799 788 A1   10/1997
JP    8-169693 A      7/1996
(Continued)

OTHER PUBLICATIONS

International Search Report dated May 9, 2017, issued in counterpart International Application No. PCT/JP2017/005380 (2 pages).
(Continued)

*Primary Examiner* — David B Jones
(74) *Attorney, Agent, or Firm* — Westerman, Hattori, Daniels & Adrian, LLP (57) ABSTRACT

An engagement chain has two chain members. Each of the chain members includes link plates, each of which has two pin holes, and coupling pins. The two pin holes are aligned in the advancing/retreating direction and are sized differently from each other. Each of the coupling pins of each chain member is tightly received in the smaller pin hole of the two pin holes of one of any adjacent two of the link plates in the advancing/retreating direction and is loosely received in the larger pin hole of the two pin holes of the other one of the two adjacent link plates. In a state in which the chain members are integrated with each other, any two (Continued)

of the coupling pins that are opposed to each other are in the same received states in the corresponding pin holes.

5 Claims, 5 Drawing Sheets (51) Int. Cl.
*F16H 27/02* (2006.01)
*F16H 19/06* (2006.01)
*B66F 3/06* (2006.01)
*F16H 29/20* (2006.01)
*F16H 29/02* (2006.01)
*F16G 13/06* (2006.01)
*F16G 13/20* (2006.01)
*B66F 7/28* (2006.01)
*B66F 13/00* (2006.01)

(52) U.S. Cl.
CPC ............ *B66F 13/005* (2013.01); *F16G 13/06* (2013.01); *F16G 13/20* (2013.01); *F16H 19/06* (2013.01); *F16H 27/02* (2013.01); *F16H 29/02* (2013.01); *F16H 29/20* (2013.01)

(58) Field of Classification Search
CPC .... F16H 19/06; B66F 3/06; B66F 7/12; B66F 7/28; B66F 13/005
USPC ........................ 59/79.3, 78, 84; 254/385, 358
See application file for complete search history.

(56) References Cited

U.S. PATENT DOCUMENTS

| 8,500,101 | B2* | 8/2013 | Yaoi | F16G 13/20 254/358 |
| 8,776,491 | B2* | 7/2014 | Oitaka | F16G 13/20 254/358 |
| 8,984,975 | B2* | 3/2015 | Saji | F16G 13/20 74/89.2 |
| 2006/0219144 | A1 | 10/2006 | Phelan et al. | |
| 2008/0315167 | A1 | 12/2008 | Takeuchi et al. | |
| 2009/0026018 | A1 | 1/2009 | Kempf | |
| 2010/0044190 | A1 | 2/2010 | Ando et al. | |
| 2011/0101294 | A1 | 5/2011 | Yaoi et al. | |

FOREIGN PATENT DOCUMENTS

| JP | 2001-241211 A | 9/2001 |
| JP | 2008-256202 A | 10/2008 |
| JP | 2009-1377 A | 1/2009 |
| JP | 2010-138926 A | 6/2010 |
| JP | 2013-57332 A | 3/2013 |
| JP | 2013-92174 A | 5/2013 |
| KR | 10 2015 0079507 A | 7/2015 |
| TW | 201009216 A1 | 3/2010 |
| TW | 201116741 A1 | 5/2011 |

OTHER PUBLICATIONS

Taiwanese Office Action dated Feb. 22, 2016, issued in counterpart Tawainese Patent Application No. 106105169 (3 pages).

* cited by examiner

ENGAGEMENT CHAIN AND MOVABLE BODY MOVEMENT DEVICE

BACKGROUND OF THE INVENTION

The present invention relates to an engagement chain and a movable body movement device that moves a movable body using the engagement chain.

Conventionally, an engagement chain used in a state incorporated in an engagement chain actuator is known as one such engagement chain (see, for example, Patent Document 1). In the engagement chain actuator, a lifting table is selectively raised and lowered by driving two engagement chains, which are capable of selectively advancing and retreating. The two engagement chains are engaged to be integrated with each other when moving in the advancing direction and are disengaged from each other in order to bifurcate when moving in the retreating direction.

Each of the engagement chains is formed by outer link plates and inner link plates, which are coupled together in the longitudinal direction. The outer link plates and the inner link plates each have two pin holes. Each of the outer link plates and an adjacent one of the inner link plates in the longitudinal direction are coupled to each other in a flexible manner by inserting coupling pins into the pin holes of the link plates. The outer link plates are arranged in the width direction of each chain. Each of the inner link plates is arranged between the corresponding adjacent two of the outer link plates in the width direction of the chain. A common coupling pin is inserted in the corresponding pin holes of the outer and inner link plates overlapped in the width direction of the chain.

PRIOR ART DOCUMENT

Patent Document

Patent Document 1: Japanese Laid-Open Patent Publication No. 2010-138926

SUMMARY OF THE INVENTION

In the above-described engagement chains, the two pin holes of each of the outer link plates, which are located at the outermost positions on the opposite sides in the width direction of each chain, are sized differently from the two pin holes of each of the inner link plates. As a result, the outer link plate and the inner link plate cannot be configured identically with one another. Namely, the outer link plate and the inner link plate cannot be provided as common parts. As such, this hampers reduction in the number of types of components that constitute the engagement chain.

Accordingly, it is an objective of the present invention to provide an engagement chain and a movable body movement device that are capable of reducing the number of types of components that constitute a chain member.

Means for achieving the above objective and advantages thereof will now be discussed.

To achieve the foregoing objective and in accordance with one aspect of the present invention, an engagement chain is provide that includes at least two chain members that are capable of selectively advancing and retreating. The chain members are engaged to be integrated with each other by moving in an advancing direction. The chain members are disengaged from each other to bifurcate by moving in a retreating direction from an engaged state in which the chain members are integrated with each other. Each of the chain members includes a plurality of link plates, each having two pin holes, and a plurality of coupling pins. Each of the chain members is configured by pivotally coupling the link plates in series by the coupling pins in the pin holes. The two pin holes of each link plate are aligned in an advancing/retreating direction of the chain members and are sized differently from each other. Each of the coupling pins of each chain member is tightly received in the smaller one of the two pin holes of one of any adjacent two of the link plates in the advancing/retreating direction and is loosely received in the larger one of the two pin holes of the other one of the two adjacent link plates. In a state in which the chain members are engaged so as to be integrated with each other, any two of the coupling pins that are opposed to each other in a direction perpendicular to both the advancing/retreating direction and a direction in which each coupling pin extends are in the same received states in the corresponding pin holes.

In this configuration, the link plates that constitute one of the two chain members are configured identically, that is, they are common parts, with the link plates that constitute the other one of the chain members. The number of types of components that constitute each of the chain members is thus reduced.

In the above-described engagement chain, each of the link plates preferably has a claw portion. The two chain members are preferably integrated with each other when the claw portions of the link plates of one of the chain members are engaged with the claw portions of the link plates of the other one of the chain members. In each link plate, the claw portion is preferably arranged at a position closer to the smaller one of the two pin holes than to the larger one of the pin holes.

This configuration stabilizes the engaged state of the claw portions of the link plates of the two chain members.

In the above-described engagement chain, each of the link plates preferably has a claw portion. The two chain members are preferably integrated with each other when the claw portions of the link plates of one of the chain members are engaged with the claw portions of the link plates of the other one of the chain members. In each link plate, the claw portion is preferably arranged at a position closer to the larger one of the two pin holes than to the smaller one of the pin holes.

This configuration absorbs displacement of the claw portions of the link plates of the two chain members at the time of engagement of the claw portions.

In the above-described engagement chain, each of the chain members is preferably configured by the coupling pins and the link plates.

In this configuration, each chain member is constituted by only two types of components. This simplifies the structure of the chain member.

To achieve the foregoing objective and in accordance with one aspect of the present invention, a movable body movement device is provided that includes the above-described engagement chain and a movable body that is coupled to the engagement chain and is movable in the advancing/retreating direction of the engagement chain together with the engagement chain.

This configuration ensures the same operation and advantages as those of the above-described engagement chain.

According to the present invention, the number of types of components that constitute a chain member is decreased.

DETAILED DESCRIPTION OF THE PREFERRED EMBODIMENTS

A movable body movement device according to one embodiment will now be described with reference to the drawings.

Figure 1:
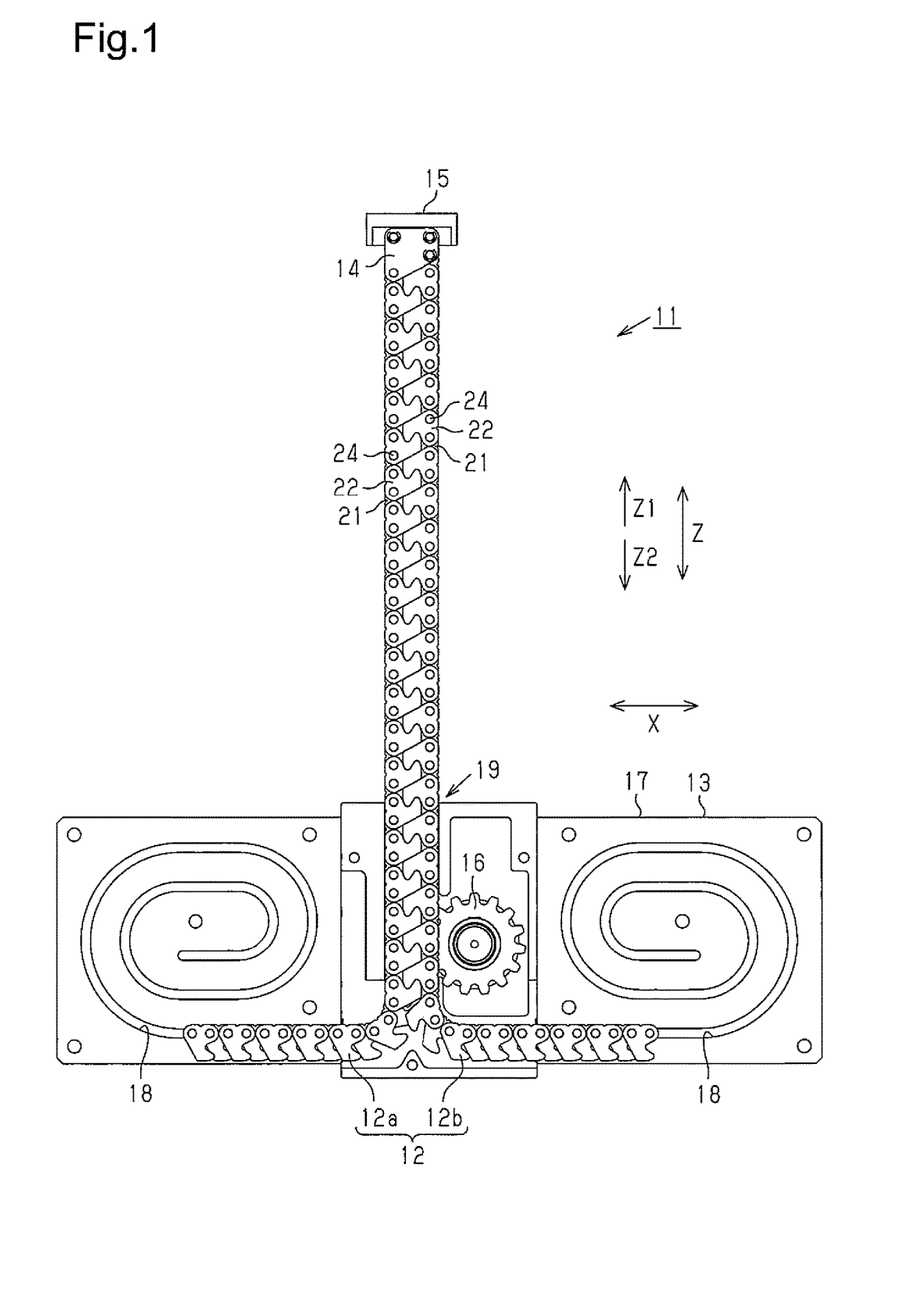
FIG. 1 is a front view of a movable body movement device according to one embodiment, showing a state in which an engagement chain moves in the advancing direction.

As shown in FIG. 1, a movable body movement device 11 includes an engagement chain 12, an accommodating portion 13, which is arranged in a fixed state, and a movable body 15, which is coupled to the distal end of the engagement chain 12 through a coupling link 14. The engagement chain 12 has two chain members 12a, 12b forming a pair, which can be engaged with each other, and is capable of selectively advancing and retreating in the longitudinal direction of the engagement chain 12.

Figure 2:
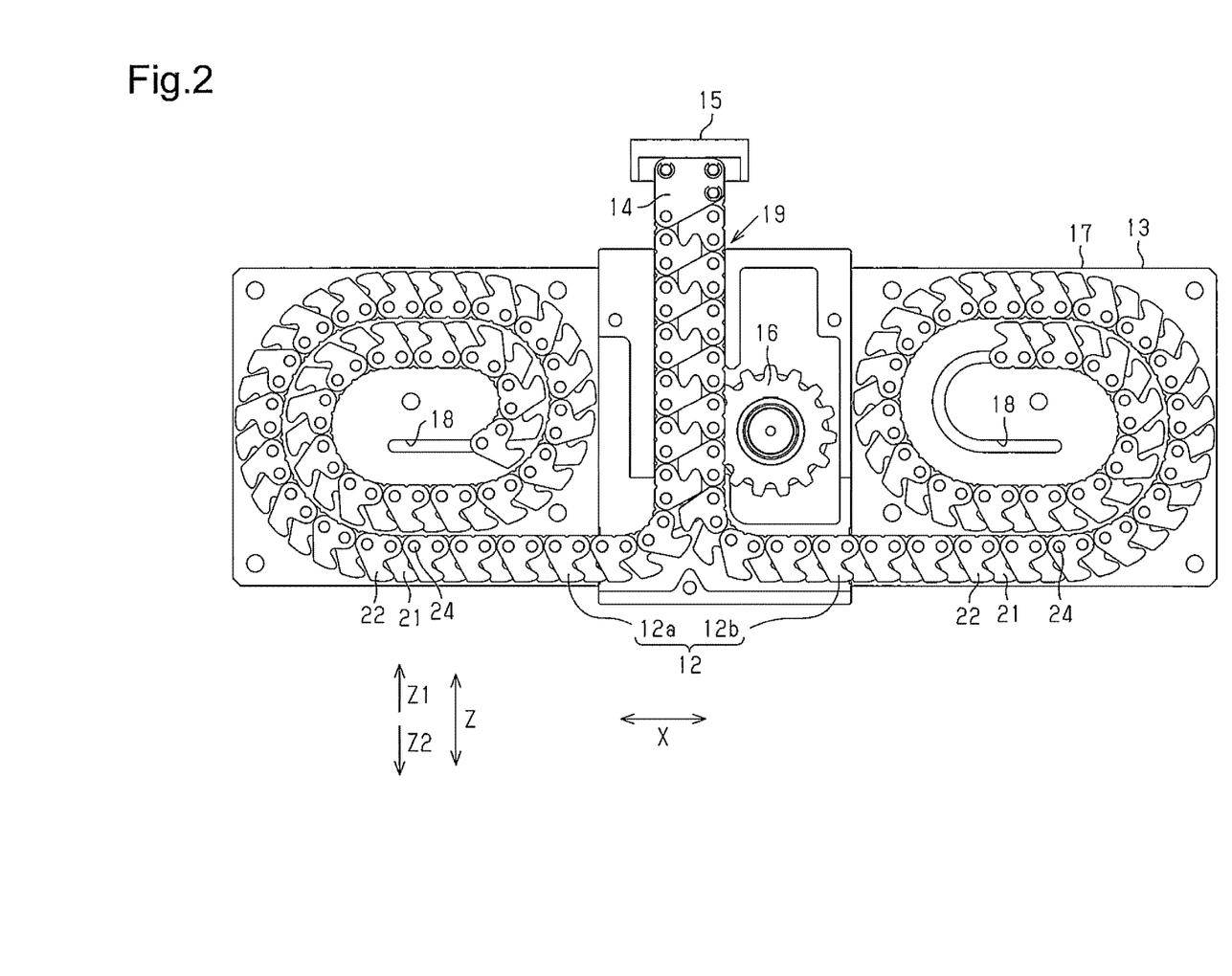
FIG. 2 is a front view of the movable body movement device, showing a state when the engagement chain has retreated most.

Hereinafter, the direction in which the engagement chain 12 advances and retreats to move the movable body 15 will be referred to as an advancing/retreating direction Z. In this case, the direction in which the engagement chain 12 advances (the upward direction as viewed in FIG. 1) will be referred to as an advancing direction Z1. The direction in which the engagement chain 12 retreats (the downward direction as viewed in FIG. 1) will be referred to as a retreating direction Z2. Of the directions perpendicular to the advancing/retreating direction Z, the direction in which the two chain members 12a, 12b are disengaged from each other to bifurcate when the engagement chain 12 moves in the retreating direction from the engaged state in which the chain members 12a, 12b are engaged in order to be integrated with each other will be referred to as a bifurcating direction X (the left-right direction as viewed in FIG. 1). The direction perpendicular to both the advancing/retreating direction Z and the bifurcating direction X will be referred to as a front-rear direction Y (the direction perpendicular to the sheet surface of FIG. 1). FIGS. 1 and 2 show the configuration of the interior of the accommodating portion 13 with the illustration of the exterior of the accommodating portion 13 omitted.

With reference to FIG. 1, the accommodating portion 13 is configured to accommodate the engagement chain 12. A sprocket 16 is arranged in a middle section of the interior of the accommodating portion 13 in the bifurcating direction X such that the sprocket 16 becomes engaged with the chain member 12b (the engagement chain 12). The sprocket 16 is rotatable about the axis extending in the front-rear direction Y in both the forward and reverse directions. A non-illustrated motor drives the sprocket 16 to rotate in both the forward and reverse directions. As the sprocket 16 is driven to rotate, the engagement chain 12 selectively advances and retreats in the advancing/retreating direction Z.

The accommodating portion 13 includes a guide plate 17, which has a rectangular shape substantially identical to the shape of the exterior (not shown) as viewed in the front-rear direction Y. Two guide grooves 18 are arranged in the inner side surface of the guide plate 17 in a manner substantially symmetrical in the left-right direction as viewed in FIG. 1. Each of the guide grooves 18 has a spiral portion that is capable of guiding the corresponding one of the two chain members 12a, 12b such that the chain members 12a, 12b move while winding spirally after bifurcating from each other from the engaged state.

Two guide grooves 18 are arranged in the inner side surface of the exterior (not shown) of the accommodating portion 13 in correspondence with the two guide grooves 13 of the guide plate 17. As a result, in each of the inner side surfaces of the accommodating portion 13 in the front-rear direction Y, the corresponding two of the guide grooves 18 are formed so as to be opposed to the other two of the guide grooves 18. An opening 19, through which the engagement chain 12 is passed, is formed substantially in the middle portion in the bifurcating direction X of the surface of the accommodating portion 13 on the leading side in the advancing direction Z1.

Figure 3:
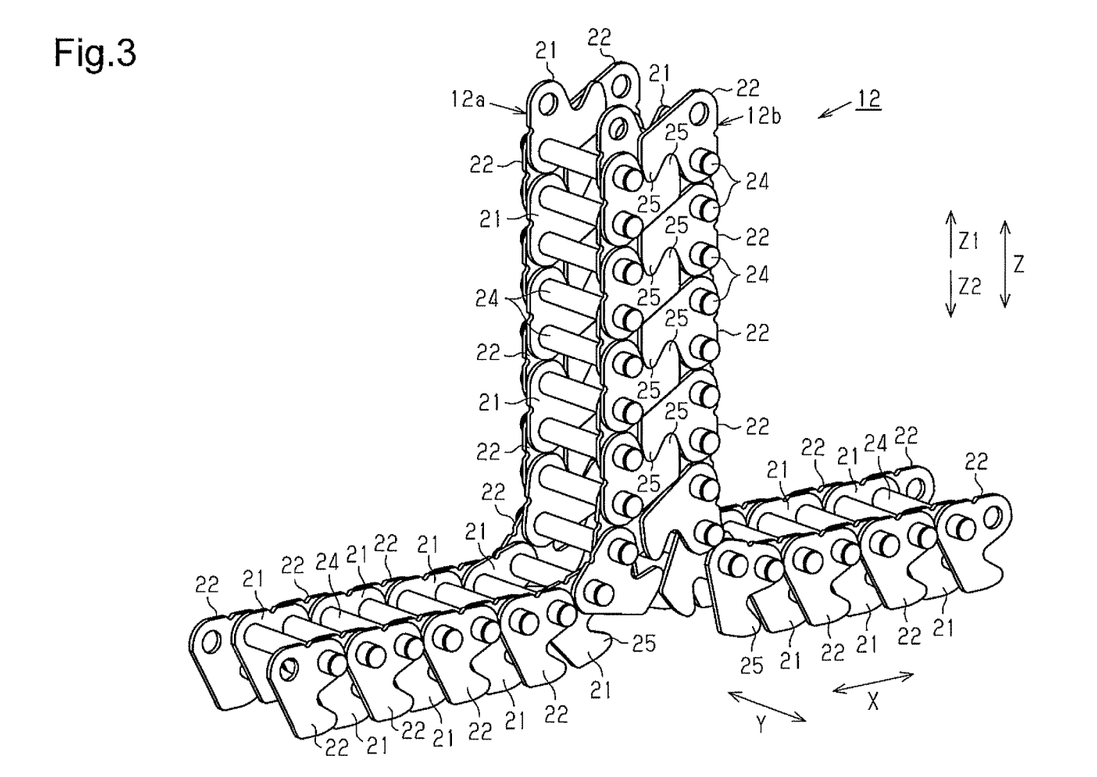
FIG. 3 is a perspective view showing part of the engagement chain, which is a component of the movable body movement device.
Figure 4:
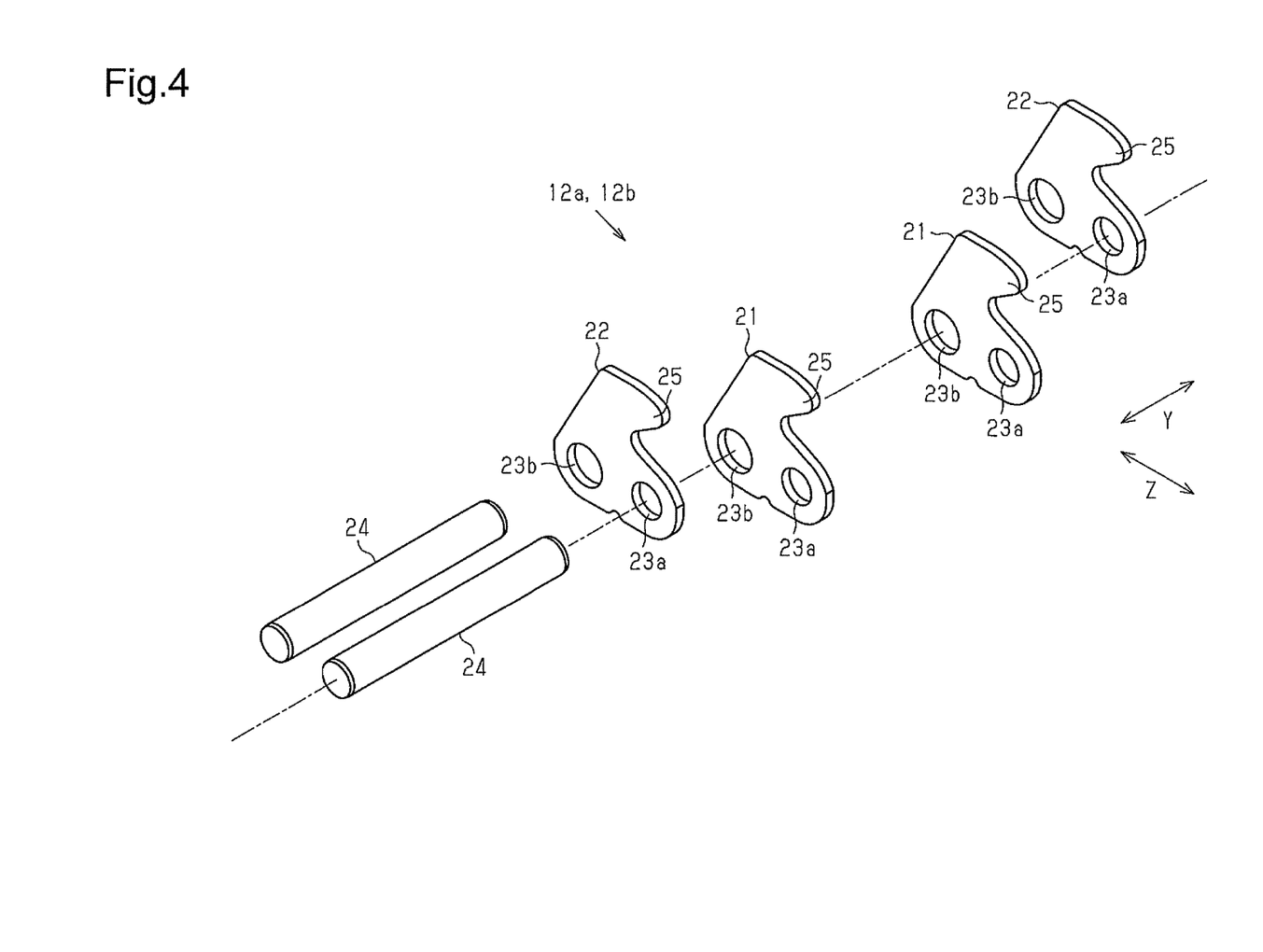
FIG. 4 is an exploded perspective view showing part of a chain member, which is a component of the engagement chain.

As illustrated in FIGS. 3 and 4, in the present embodiment, a single chain member is employed as each of the two chain members 12a, 12b, which constitute the engagement chain 12. The chain members 12a, 12b each have pairs of inner plates 21, which are examples of link plates coupled in series (sequentially in a series arrangement direction) along the advancing/retreating direction Z, and pairs of outer plates 22, which are examples of the link plates.

The inner plates 21 and the outer plates 22 are configured identically and each have a hook-shaped claw portion 25. The claw portions 25 arranged in the outer plates 22 and the inner plates 21 of the chain member 12a are allowed to engage from the leading side in the advancing direction Z1. On the other hand, the claw portions 25 arranged in the outer plates 22 and the inner plates 21 of the chain member 12b are allowed to engage from the leading side in the retreating direction Z2. The claw portions 25 of the outer plates 22 and the inner plates 21 of the chain member 12a can thus be engaged with the claw portions 25 of the outer plates 22 and the inner plates 21 of the chain member 12b.

That is, the two chain members 12a, 12b are engaged with each other by the means of the claw portions 25 of the outer plates 22 and the claw portions 25 of the inner plates 21.

Further, two circular pin holes 23a, 23b are formed to extend through each of the inner plates 21 and each of the outer plates 22. The two pin holes 23a, 23b are aligned in the series arrangement direction of each chain member 12a, 12b, which extends in the advancing/retreating direction Z. The two pin holes 23a, 23b are sized differently from each other. In the inner plates 21 and the outer plates 22 of the present embodiment, the pin holes 23a are sized slightly smaller than the pin holes 23b. In each of the inner and outer plates 21, 22, the claw portion 25 is arranged at a position closer to the pin hole 23a than to the pin hole 23b.

The inner plates 21 are adjacent to the corresponding outer plates 22 with the ends overlapped with each ether in the series arrangement direction along the advancing/retreating direction Z. The two chain members 12a, 12b each have columnar coupling pins 24, which pivotally join the pairs of inner plates 21 and the pairs of outer plates 22 in series through the corresponding pin holes 23a, 23b. Each of the coupling pins 24 is tightly received in the pin holes 23a of the corresponding ones of the cuter plates 22, each of which is sized smaller than each pin hole 23b, and also be loosely received in the pin holes 23b of the corresponding ones of the inner plates 21, each of which is sized larger than each pin hole 23a. Alternatively, each coupling pin 24 is loosely received in the pin holes 23b of the corresponding ones of the outer plates 22, each of which is sized larger than each pin hole 23a, and also be tightly received in the pin holes 23a of the corresponding ones of the inner plates 21, each of which is sized smaller than each pin hole 23b.

That is, each coupling pin 24 is non-pivotally received in the corresponding pin holes 23a, which are sized smaller than the pin holes 23b, and is pivotally received in the corresponding pin holes 23b, which are sized larger than the pin holes 23a. In this case, in each of the inner and outer plates 21, 22, the claw portion 25 is arranged at a position closer to the pin hole 23a, in which the corresponding coupling pin 24 is tightly received, than to the pin hole 23b.

Each of the chain members 12a, 12b of the present embodiment is configured by the coupling pins 24 and the inner and outer plates 21, 22, which are configured identically, without employing bushings or rollers. That is, the chain members 12a, 12b are both configured by only two types of components.

The opposite ends of each coupling pin 24 project outward with respect to the corresponding outer plates 22 in the front-rear direction Y. To accommodate the two chain members 12a, 12b in the accommodating portion 13, the opposite ends of the coupling pins 24 of the chain member 12a are slidably inserted in the corresponding two of the four guide grooves 18, each of which is opposed to the corresponding one of the guide grooves 18 in the front-rear direction Y in the accommodating portion 13. Meanwhile, the opposite ends of the coupling pins 24 of the chain member 12b are slidably inserted in the other two of the guide grooves 18.

That is, to accommodate the two chain members 12a, 12b in the accommodating portion 13, one of the ends of each coupling pin 24 is inserted in the corresponding one of the guide grooves 18 arranged in the guide plate 17 of the accommodating portion 13. The other one of the ends of the coupling pin 24 is inserted in the corresponding one of the guide grooves 18 arranged in the inner side surface of the exterior (not shown) of the accommodating portion 13.

As illustrated in FIG. 1, as the two chain members 12a, 12b move in the advancing direction Z1, the claw portions 25 of the outer plates 22, as well as the claw portions 25 of the inner plates 21, in the chain members 12a, 12b become engaged with each other. This switches the engagement chain 12 to an engaged state of a rigid body structure integrated into a straight bar. On the other hand, with reference to FIG. 2, as the two chain members 12a, 12b move in the retreating direction Z2 from the engaged state, the engagement chain 12 is disengaged to bifurcate in the bifurcating direction X such that most of the engagement chain 12 is accommodated in the accommodating portion 13. Specifically, in the two chain members 12a, 12b, any mutually engaged ones of the outer plates 22, as well as any mutually engaged ones of the inner plates 21, which are adjacent to the corresponding outer plates 22 in the advancing/retreating direction Z, are located at positions in the advancing/retreating direction Z that are offset from each other by a single pitch of the coupling pins 24, which are aligned in the advancing/retreating direction Z.

Referring to FIGS. 1 and 2, the end of the engagement chain 12 in the longitudinal direction on the leading side in the advancing direction Z1 is coupled to the movable body 15. Various types of functional members (such as a lifting table or a crane) are attached to the movable body 15. When the movable body 15 moves in the advancing/retreating direction Z as the engagement chain 12 selectively advances and retreats, the functional member, which is attached to the movable body 15, moves in the advancing/retreating direction Z together with the movable body 15.

The following is description of the operation of the movable body movement device 11 at the time the two chain members 12a, 12b move in the advancing direction Z1 and thus become engaged with each other to switch the engagement chain 12 to the engaged state of the rigid body structure integrated into a straight bar.

To switch the engagement chain 12 to the engaged state by engaging the two chain members 12a, 12b to each other, the sprocket 16 is driven to rotate clockwise as viewed in FIG. 2. This moves the two chain members 12a, 12b in the advancing direction Z1 while guiding the chain members 12a, 12b through the coupling pins 24 by means of the guide grooves 18, which are arranged in the guide plate 17 and the exterior (not shown). As a result, in the two chain members 12a, 12b, the mutually corresponding ones of the outer plates 22, as well as the mutually corresponding ones of the inner plates 21, become sequentially engaged with each other in an alternating manner through the claw portions 25. The engagement chain 12 is thus switched to the engaged state as illustrated in FIG. 1.

Figure 5:
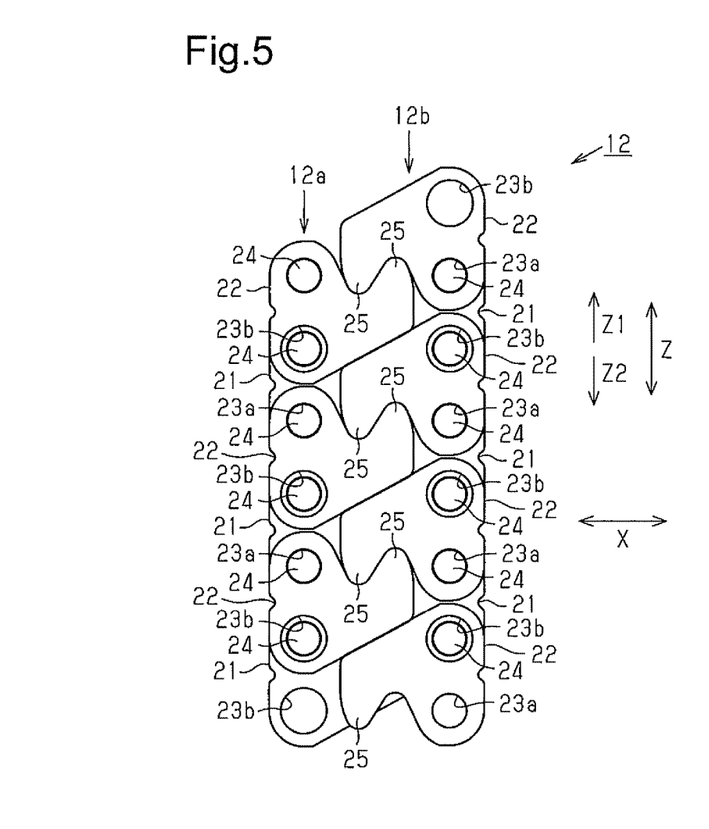
FIG. 5 is an enlarged front view showing part of the engagement chain.

At this time, with reference to FIG. 5, in the engagement chain 12, the coupling pins 24 that are opposed to each other in the bifurcating direction X, which is a direction perpendicular to both the advancing/retreating direction Z and the front-rear direction Y, or the direction in which each coupling pin 24 extends, are in the same received states in the pin holes 23a, 23b. That is, when one of the two coupling pins 24 that are opposed to each other in the bifurcating direction X is loosely received in the pin hole 23b of the corresponding one of the outer plates 22 and tightly received in the pin hole 23a of the corresponding one of the inner plates 21, the ether one of the two coupling pins 24 is also loosely received in the pin hole 23b of the corresponding one of the outer plates 22 and tightly received in the pin hole 23a of the corresponding one of the inner plates 21. On the other hand, when one of the two coupling pins 24 that are opposed to each other in the bifurcating direction X is tightly received in the pin hole 23a of the corresponding one of the outer plates 22 and loosely received in the pin hole 23b of the corresponding one of the inner plates 21, the other one of the two coupling pins 24 is also tightly received in the pin hole 23a of the corresponding one of the outer plates 22 and loosely received in the pin hole 23b of the corresponding one of the inner plates 21.

In this case, the pin hole 23b on the leading side in the retreating direction Z2 in each of the outer and inner plates 22, 21 of the chain member 12a is opposed, in the bifurcating direction X, to the pin hole 23b on the leading side in the advancing direction Z1 in the one of the outer and inner plates 22, 21 of the chain member 12b that is adjacent, on the leading side in the retreating direction Z2, to the aforementioned one of the outer and inner plates 22, 21.

On the other hand, the pin hole 23a on the leading side in the advancing direction Z1 in each of the outer and inner plates 22, 21 of the chain member 12a is opposed, in the bifurcating direction X, to the pin hole 23a on the leading side in the retreating direction Z2 in the one of the outer and inner plates 22, 21 of the chain member 12b that is adjacent, on the leading side in the advancing direction Z1, to the aforementioned one of the outer and inner plates 22, 21.

As a result, the outer plates 22 and inner plates 21 that constitute the chain member 12a and the outer plates 22 and inner plates 21 that constitute the chain member 12b are all configured identically (are all common parts). This reduces the number of types of components that constitute the two chain members 12a, 12b and thus reduces the number of types of components that constitute the engagement chain 12.

When the engagement chain 12 is in the engaged state, the engaged portions of the claw portions 25 of corresponding two of the outer plates 22, as well as the engaged portions of the claw portions 25 of corresponding two of the inner plates 21, in the two chain members 12a, 12b are arranged between the corresponding two of the coupling pins 24, which are tightly received in the corresponding two of the pin holes 23a, which are opposed to each other in the bifurcating direction X. This configuration stabilizes the engaged state of the claw portions 25 of the cuter plates 22 and the engaged state of the claw portions 25 of the inner plates 21 in the two chain members 12a, 12b.

The above-described embodiment achieves the following advantages.

(1) When the engagement chain 12 is in the engaged state, in which the two chain members 12a, 12b are engaged to be integrated with each ether, the coupling pins 24 that are opposed to each ether in the bifurcating direction X are in the same received states in the corresponding pin holes 23a, 23b. As a result, the outer plates 22 and inner plates 21 that constitute the chain member 12a and the outer plates 22 and inner plates 21 that constitute the chain member 12b are all configured identically (are all common parts). This reduces the number of types of components that constitute each of the two chain members 12a, 12b and thus reduces the number of types of components that constitute the engagement chain 12. Additionally, the pitch of the outer plates 22 and the pitch of the inner plates 21 become equal to each other in the two chain members 12a, 12b. This ensures a smoothly meshed state of the engagement chain 12 and the sprocket 16.

(2) In the engagement chain 12, the two chain members 12a, 12b are integrated with each other through engagement between the claw portion 25 of each of the outer and inner plates 22, 21 of the chain member 12a and the claw portion 25 of the corresponding one of the outer and inner plates 22, 21 of the chain member 12b. In each of the outer plates 22, the claw portion 25 is arranged at a position closer to the pin hole 23a, in which the corresponding coupling pin 24 is tightly received, than to the pin hole 23b. Similarly, in each of the inner plates 21, the claw portion 25 is arranged at a position closer to the pin hole 23a, in which the corresponding coupling pin 24 is tightly received, than to the pin hole 23b. This configuration stabilizes the engaged state of the claw portions 25 of the cuter plates 22 and the engaged state of the claw portions 25 of the inner plates 21 in the two chain members 12a, 12b.

(3) In the engagement chain 12, the two chain members 12a, 12b are each constituted by the coupling pins 24 and the outer and inner plates 22, 21, which are configured identically. Each of the chain members 12a, 12b is thus constituted by only two types of components. This simplifies the structure of each chain member 12a, 12b.

(4) The engagement chain 12 is constituted without employing bushings. The number of types of components and the weight of the engagement chain 12 are thus decreased by the lack of bushings, compared to an engagement chain employing bushings. This reduces the amount of deflection of the engagement chain 12 caused by the weight of the engagement chain 12 at the time the movable body movement device 11 is used in a state in which the horizontal direction coincides with the advancing/retreating direction Z. As a result, the stroke (the advancing/retreating distance) of the engagement chain 12 is increased compared to the engagement chain employing bushings. Additionally, the lack of bushings in the engagement chain 12 eliminates the noise produced by contact between the bushings and coupling pins. This decreases noise in use compared to the engagement chain employing bushings.

Modifications

The above embodiment may be modified as follows.

Figure 6:
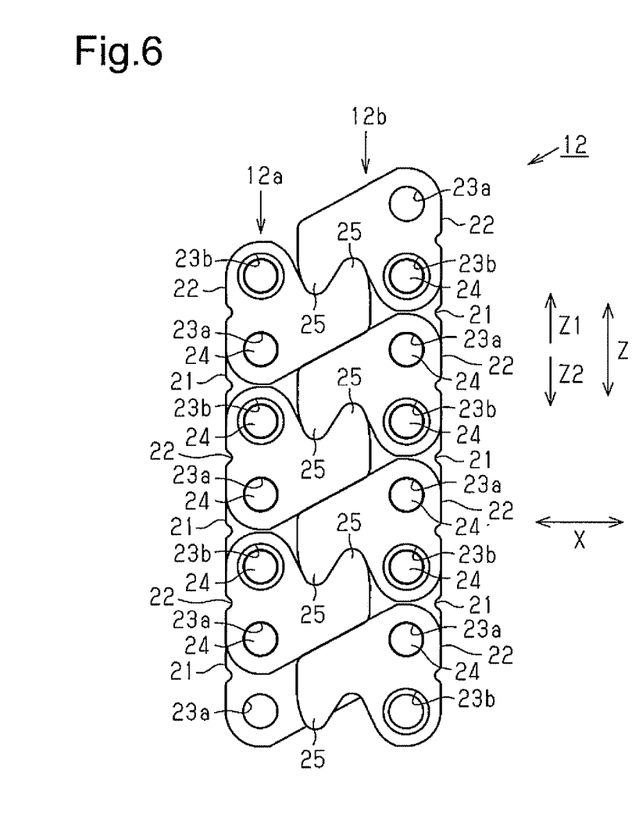
FIG. 6 is an enlarged front view showing part of an engagement chain according to a modification.

As shown in FIG. 6, in each of the inner and outer plates 21, 22, the claw portion 25 may be arranged at a position closer to the pin hole 23b, in which the corresponding coupling pin 24 is loosely received, than to the pin hole 23a. In this case, the pin hole 23b on the leading side in the advancing direction Z1 in each of the outer and inner plates 22, 21 of the chain member 12a is opposed, in the bifurcating direction X, to the pin hole 23b on the leading side in the retreating direction Z2 in the one of the outer and inner plates 22, 21 of the chain member 12b that is adjacent, on the leading side in the advancing direction Z1, to the aforementioned one of the outer and inner plates 22, 21. On the other hand, the pin hole 23a on the leading side in the retreating direction Z2 in each of the outer and inner plates 22, 21 of the chain member 12a is opposed, in the bifurcating direction X, to the pin hole 23a on the leading side in the advancing direction Z1 in the one of the outer and inner plates 22, 21 of the chain member 12b that is adjacent, on the leading side in the retreating direction Z2, to the aforementioned one of the outer and inner plates 22, 21. Further, in this case, the engaged portions of the claw portions 25 of any corresponding two of the outer plates 22, as well as the engaged portions of the claw portions 25 of any corresponding two of the inner plates 21, in the two chain members 12a, 12b are arranged between the corresponding two of the coupling pins 24, which are loosely received in the corresponding opposed two of the pin holes 23b in the bifurcating direction X. This configuration absorbs displacement of the claw portions 25 of the corresponding inner plates 21 and displacement of the claw portions 25 of the corresponding outer plates 22; in the two chain members 12a, 12b at the time of engagement of the claw portions 25.

The engagement, chain 12 may include rollers, through each of which the corresponding one of the coupling pins 24 is inserted.

Each of the chain members 12a, 12b, which configure the engagement chain 12, may be constituted by two or more rows of chain members.

The engagement chain 12 may be configured by two or more pairs of chain members.

The movable body movement device 11 may be oriented in any suitable manner. For example, the movable body movement device 11 may be arranged such that the advancing/retreating direction Z coincides with the horizontal direction or that the advancing/retreating direction Z crosses the horizontal direction.

DESCRIPTION OF THE REFERENCE NUMERALS

11 . . . Movable body movement device, 12 . . . Engagement chain, 12a, 12b . . . Chain Member, 15 . . . Movable Body, 21 . . . Inner Plate as Example of Link Plate, 22 . . .

Outer Plate as Example of Link Plate, 23a, 23b ... Pin Hole, 24 ... Coupling Pin, 25 ... Claw Portion, Z ... Advancing/Retreating Direction, Z1 ... Advancing Direction, Z2 ... Retreating Direction

The invention claimed is:

1. An engagement chain comprising at least two chain members that are capable of selectively advancing and retreating, wherein
   the chain members are engaged to be integrated with each other by moving in an advancing direction,
   the chain members are disengaged from each other to bifurcate by moving in a retreating direction from an engaged state in which the chain members are integrated with each other,
   each of the chain members includes a plurality of link plates, each having two pin holes, and a plurality of coupling pins,
   each of the chain members is configured by pivotally coupling the link plates in series by the coupling pins in the pin holes,
   the two pin holes of each link plate are aligned in an advancing/retreating direction of the chain members and are sized differently from each other,
   each of the coupling pins of each chain member is tightly received in the smaller one of the two pin holes of one of any adjacent two of the link plates in the advancing/retreating direction and is loosely received in the larger one of the two pin holes of the other one of the two adjacent link plates, and
   in a state in which the chain members are engaged so as to be integrated with each other, any two of the coupling pins that are opposed to each other in a direction perpendicular to both the advancing/retreating direction and a direction in which each coupling pin extends are in the same received states in the corresponding pin holes.

2. The engagement chain according to claim 1, wherein
   each of the link plates has a claw portion,
   the two chain members are integrated with each other when the claw portions of the link plates of one of the chain members are engaged with the claw portions of the link plates of the other one of the chain members, and
   in each link plate, the claw portion is arranged at a position closer to the smaller one of the two pin holes than to the larger one of the pin holes.

3. The engagement chain according to claim 1, wherein
   each of the link plates has a claw portion,
   the two chain members are integrated with each other when the claw portions of the link plates of one of the chain members are engaged with the claw portions of the link plates of the other one of the chain members; and
   in each link plate, the claw portion is arranged at a position closer to the larger one of the two pin holes than to the smaller one of the pin holes.

4. The engagement chain according to claim 1, wherein each of the chain members is configured by the coupling pins and the link plates.

5. A movable body movement device comprising:
   the engagement chain according to claim 1; and
   a movable body that is coupled to the engagement chain and is movable in the advancing/retreating direction of the engagement chain together with the engagement chain.

* * * * *